United States Patent [19]

Vecht et al.

[11] Patent Number: 4,897,851

[45] Date of Patent: Jan. 30, 1990

[54] WATER COOLED LASER HOUSING AND ASSEMBLY

[75] Inventors: David L. Vecht, Mountain View; Shinan-Chur S. Sheng, Sunnyvale, both of Calif.

[73] Assignee: Spectra-Physics, San Jose, Calif.

[21] Appl. No.: 264,263

[22] Filed: Oct. 28, 1988

[51] Int. Cl.⁴ .............................................. H01S 3/08
[52] U.S. Cl. ..................................... 372/107; 372/35; 372/37
[58] Field of Search ........................ 372/34, 35, 37, 61, 372/107, 109, 92, 99

[56] References Cited

U.S. PATENT DOCUMENTS

| | | | |
|---|---|---|---|
| 3,586,996 | 6/1971 | Milochevitch et al. | 372/35 |
| 4,464,763 | 6/1981 | Mohler | 372/107 |
| 4,715,039 | 12/1987 | Miller et al. | 372/35 |
| 4,744,091 | 5/1988 | Gorisch et al. | 372/107 |
| 4,815,095 | 3/1989 | Lee et al. | 372/35 |

Primary Examiner—William L. Sikes
Assistant Examiner—B. R. R. Holloway
Attorney, Agent, or Firm—Lyon & Lyon

[57] ABSTRACT

An optimized design for a resonator for a laser housing and assembly is disclosed, comprising a concentrically arranged plasma tube, magnet and resonator tube with the mirrors and associated optics housed at opposing ends of the resonator tube, mounted on rods extending from respective ends of the resonator tube.

25 Claims, 2 Drawing Sheets

WATER COOLED LASER HOUSING AND ASSEMBLY

BACKGROUND OF THE INVENTION

The invention relates generally to ion laser structures, and more particularly to water-cooled ion lasers including an electromagnet.

Ion laser structures are generally described in Miller, et al., U.S. Pat. No. 4,715,039, issued Dec. 22, 1987, which is hereby incorporated by reference into this specification in full. The structure typically comprises a plasma tube and an optical resonator. The plasma tube contains the gain medium, a plasma created by running a discharge between an anode and cathode mounted at opposite ends of the tube. The optical resonator supports a pair of spaced, opposed, aligned mirrors, positioned at opposing ends of the gain medium to produce lasing action. The plasma tube is disposed within the resonator by complex mounting arrangements.

In operation, a laser, such as an ion laser, generates considerable heat, which must be removed, at least in applications where stability of laser output is critical. The heat can cause thermal expansion of the resonator structure and can adversely affect the mirror alignment and thus the laser output. Water cooling of the laser is frequently utilized to minimize this problem.

By applying a magnetic field to the plasma in an ion laser tube, higher gain and efficiency are obtained. Most water cooled ion lasers include an electromagnet disposed around the plasma tube. Since the electromagnet also generates heat, it too can be water cooled.

To be most effective, the water cooling of the laser resonator must be uniform. A temperature difference between the top and bottom of the resonator may be sufficient to bend the resonator significantly, misaligning the mirrors and changing the laser output, even preventing lasing. This problem can be reduced by providing a thermal short between the top and bottom of the resonator.

Miller, et al., provided an advance in the art by utilizing a monolithic structure in which the plasma tube, surrounded by an electromagnet, is mounted in a concentrically spaced relationship within the laser resonator tube in a single unitary water cooled structure. Inner and outer flow channels are respectively defined between the plasma tube and electromagnet, and the electromagnet and resonator tube. With this integrated assembly, the complexity is minimized while the efficiency is greatly improved.

The invention of Miller, et al., although an important advance in the art of ion laser construction, can still be improved from the standpoint of the manufacturer and the user. For example, it is sometimes difficult to service the ends of the resonator tube, in which the mirrors forming the optical resonator are disposed, because of constrained accessibility within the wholly-contained end cavities. Moreover, hot air may become trapped in these end cavities such that the heat transfer into the coolant adjacent thereto is less efficient than in the central portion of the resonator containing the electromagnet. Finally, the longer the resonator tube, the more difficult it is to meet manufacturing tolerances required by ion laser technology. Thus, there exists a need in the art for further improvements in ion laser resonator design to address these problems.

Accordingly, it is an object of the present invention to provide a resonator design for water-cooled ion gas lasers in which the advantages of an integrated resonator design are retained, but performance is enhanced by substantially eliminating trapped air and end-cavity heat exchange problems.

It is a further object of the invention to reduce manufacturing tolerance difficulties for resonator tubes for water-cooled ion gas lasers, and accordingly to decrease manufacturing cost.

It is another object of the invention to improve serviceability and ease of assembly of water-cooled ion gas lasers.

It is still a further object of the invention to increase manufacturing flexibility and reduce costs by providing a relatively modular design, in which a fewer number of resonator tubes can be used with a greater number of laser designs utilizing varying optical lengths.

SUMMARY OF THE INVENTION

According to the present invention, an ion gas laser assembly is provided, comprising: a resonator tube; a magnet concentrically mounted in a spaced relationship within the resonator tube, and defining with the resonator tube an outer coolant flow channel; a plasma tube concentrically mounted in a spaced relationship within said magnet and defining with the magnet an inner coolant flow channel; and at least one mirror plate assembly disposed externally to said resonator tube, supported by external mounting means.

The invention will be best understood by a study of the following detailed description, taken in conjunction with the drawings.

DETAILED DESCRIPTION OF PREFERRED EMBODIMENTS

Figure 1:
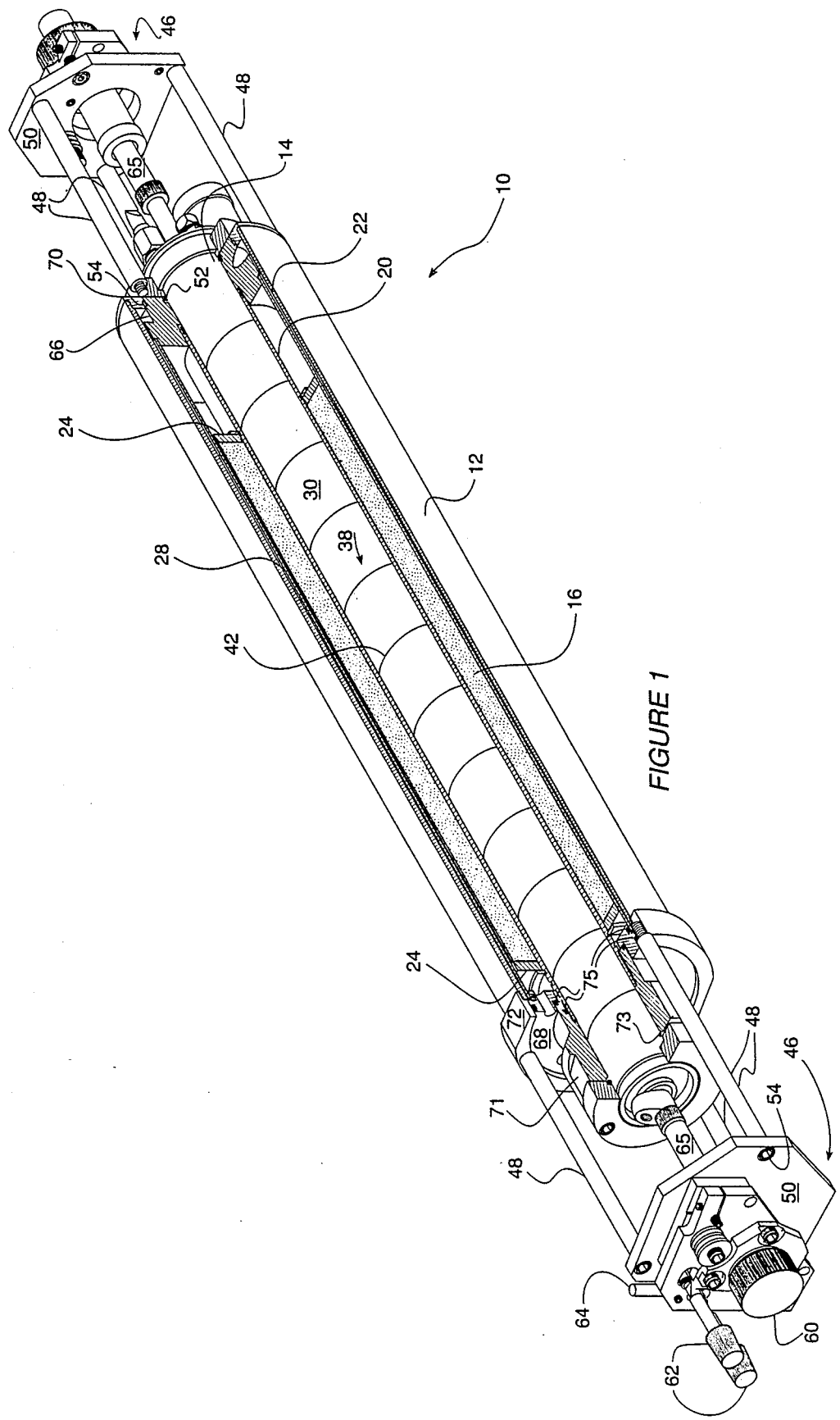
FIG. 1 is a quarter section perspective view of a first preferred embodiment of an ion-gas laser assembly of the present invention.

Turning now to the drawings, FIG. 1 shows laser housing and assembly 10 comprising a resonator tube 12 and a plasma tube 14 mounted within the resonator tube 12 in a concentric spaced apart relationship. The plasma tube 14 and resonator tube 12 are typically cylindrical in shape. An electromagnet 16 is disposed between the resonator tube 12 and the plasma tube 14 in a concentric spaced relationship. In a most preferred embodiment, the length of the resonator tube 12 is sufficient to provide a cooling jacket for the electromagnet 16 and deliver coolant to one end of the plasma tube 14, which coolant will then be carried to the other end of the plasma tube 14 as will be more fully set forth below. However, the resonator tube 12 need only be long enough to provide structural integrity to the laser housing 10. The plasma tube 14 is typically made of a ceramic, preferably alumina.

In operation, the plasma tube 14 contains a gas, preferably a noble gas, such as, but not limited to, argon, krypton or xenon, and a plasma discharge is produced within plasma tube 14 by passing a discharge current through the plasma tube 14 between an anode and cathode (not shown) disposed at opposing ends of the plasma tube 14. The components necessary to provide the gas in plasma tube 14 and produce the plasma are conventional and are not shown. Suitable electrical components, seals, and flanges can be attached to either end of laser housing 10 or plasma tube 14 as necessary.

An electromagnet 16 is formed of magnet windings wound around a magnet bobbin or core 20 (which can extend beyond the windings as shown in FIG. 1) and enclosed by an outer magnet cover 22 (which can also extend beyond the windings as shown in FIG. 1) with magnet flanges 24 defining the ends of the magnet 16. Conventional electrical connections (not shown) are provided to the windings to energize the electromagnet 16.

Electromagnet 16 is spaced apart from both resonator tube 12 and plasma tube 14 and accordingly forms an outer annular channel 28 and an inner annular channel 30 with the respective tubes. The outer channel 28 runs substantially along the length of laser housing 10 between the outside of outer magnet cover 22 of electromagnet 16 and the inside wall of resonator tube 12; and the inner channel 30 similarly runs along laser housing 10 between the inside of bobbin 20 of electromagnet 16 and the outside wall of plasma tube 14. A particularly preferred flow pattern is a helical flow around the channels 28 and 30. A helical passageway 38 is formed in inner channel 30 and a similar helical passageway (not shown) is formed in outer channel 28. The helical passageway (not shown) is a continuous helical path winding around magnet cover 22 from one end to the other, and is formed by a flow diverter means (not shown) positioned in outer channel 28. The flow diverter means forms a loose seal between magnet cover 22 and resonator tube 12 forcing coolant flow to spiral around annular channel 28 from one end to the other. The flow diverter may be formed with a spiral wire. Similarly, helical passageway 38 is formed in inner channel 30 by flow diverter means 42, e.g., a spiral wound wire as shown in FIG. 1. With the helical flow configuration, coolant flow is thus both circumferential, around the circumference of the annular channel, as well as longitudinal, from end to end of the annular channel. Any fluid can be used as the coolant, either liquids or gases. A common liquid coolant is water. The flow rate can be varied as necessary to provide the required degree of cooling. The flow path for coolant can be formed by interconnecting the channels 28, 30 in different ways, as will be appreciated by one of ordinary skill in the art.

Figure 2:
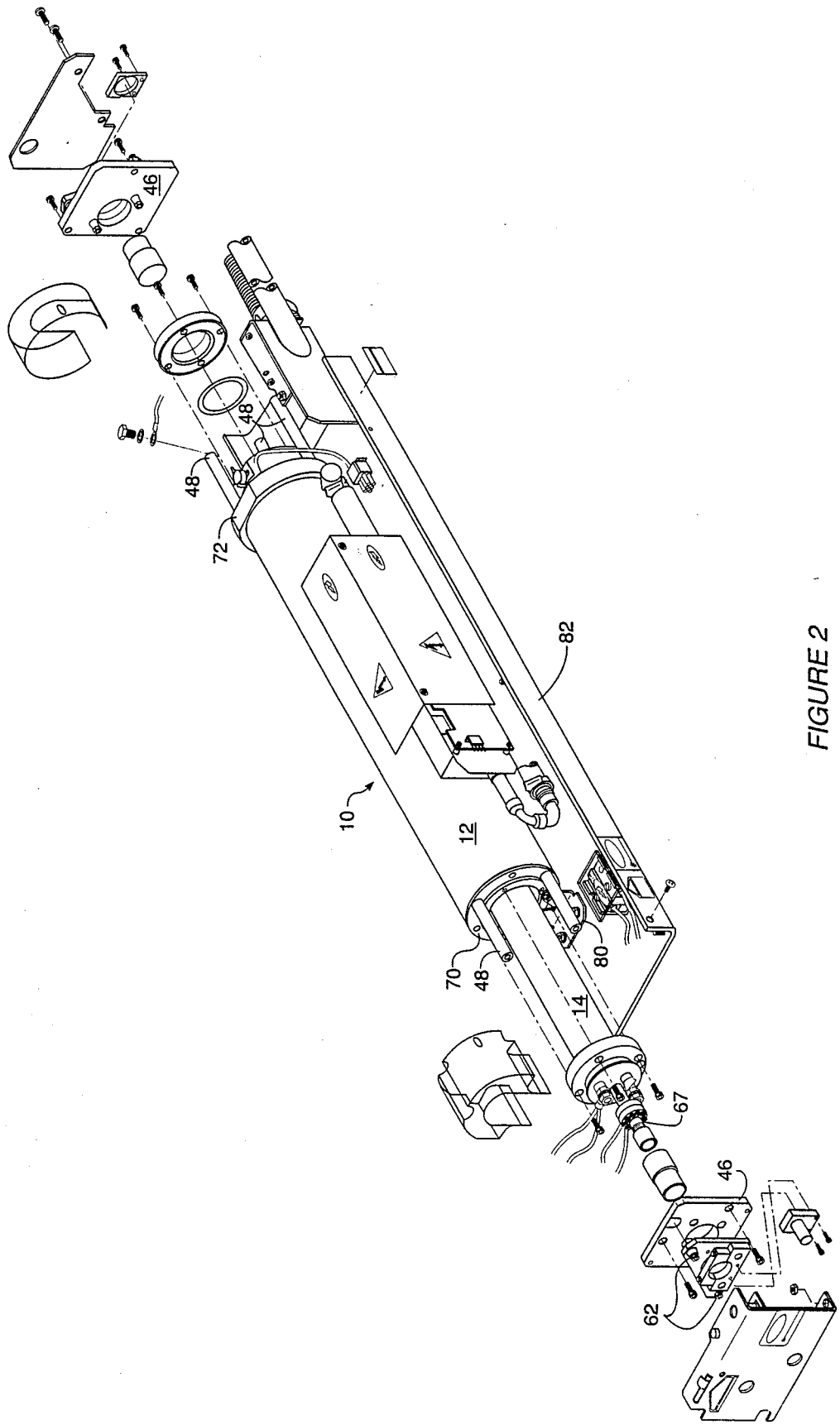
FIG. 2 is an exploded perspective view of a second preferred embodiment of an ion-gas laser assembly of the present invention.

Plasma tube 14 and resonator tube 12 are held in a spaced concentric relationship by means of flanges at each end of laser housing 10. At the cathode end of the laser housing 10, the resonator tube 12 is supported in a spaced relationship to the electromagnet 16 by a cathode bobbin flange 66 and a cathode resonator flange 70. The plasma tube 14 is supported in a spaced relationship to the electromagnet 16 by the cathode bobbin flange 66. O-rings 52, 54, respectively, sandwiched between the plasma tube 14 and the bobbin flange 66, and the bobbin flange 66 and the resonator flange 70, provide a water seal and help support the plasma tube 14 and the resonator tube 12. The cathode bobbin flange 66 is attached by bracketing means, such as a bracket 80, to the baseplate 82, as shown in FIG. 2, which baseplate 82 provides support to the laser housing 10.

At the anode end, bobbin locknut 68, bobbin endcap 71 and anode resonator flange 72 cooperate to support the resonator tube 12 in a spaced relationship to the electromagnet 16. The bobbin endcap 71 is supported by the baseplate 82 by bracketing means (not shown). Bobbin locknut 68 is sandwiched between the endcap 71 and the anode resonator flange 72, which flange 72 is preferably attached to the resonator tube 12. The plasma tube 14 is supported in a spaced relationship to the electromagnet 16 by the bobbin endcap 71 and O-ring 73, which also provides a water seal. Additional O-rings 75 provide water seals and/or support, as will be apparent to one of ordinary skill in the art. Resonator rods 48 are screwed into cathode resonator flange 70 at the cathode end and anode resonator flange 72 at the anode end of resonator tube 12.

The resonator tube 12 can be made of a variety of materials, depending on the application of the laser. If the application allows multiline, multimode operation, e.g., a medical laser, then a high coefficient of thermal expansion material, e.g., brass, may be used, since some change in the length of the optical cavity is acceptable. If the application requires single frequency operation, then a lower expansion material may be used, such as invar, graphite, etc.

At each end of the laser housing 10, a mirror plate assembly 46 is supported outboard of the laser housing 10, by external mounting means, preferably by at least three mounting rods 48. The rods 48 are securely fastened, at one end, to the laser housing 10, and at the other end, the rods 48 are secured to end plate 50. The rods 48 are preferably made of a material with a low coefficient of expansion, such as invar (36% Ni: 64% Fe), quartz, or graphite, in order to minimize the thermal effects on mirror alignment and frequency tuning. Invar is a particularly preferred material. One way to secure the rods 48 is to provide them with an external thread for threading into the resonator flanges 70 and 72, and an internal thread through which a screw 54 can be threaded to secure endplate 50. However, many ways for securing the rods to the laser housing 10 and endplate 50 will be readily apparent to one of ordinary skill.

When resonator rods 48 are used as the external mounting means, the resonator rods 48 are disposed at both ends of the resonator tube 12, and extend a sufficient distance to provide accessibility to the plasma tube windows (not shown) and to retain the mirrors at a preselected distance from each other, which distance depends, of course, on the optical requirements of the laser. While three rods are preferred from the point of view of obtaining stability while containing costs, the invention can be carried out with as few as one rod 48 or as many rods 48 as desired.

In one typical preferred embodiment, as shown in FIG. 1, a 4-inch diameter, 21.8 inch brass tube is used as the resonator tube 12, in conjunction with three 0.375-inch diameter invar rods at each end thereof. At the anode (high reflector) end, the rods 48 are 5.875 inches long and support fine adjustment mirror plates. At the cathode (output coupler) end, three rods 48, having the same diameter but only 5.34 inches in length, support coarse adjustment mirror plates. In this embodiment, each of the mirror plate assemblies 46 includes a mirror (not shown) fitted in mirror holder 60. The mirror position is adjusted by adjustment screws 62, and rocking arm 64 assists in adjustment as needed. An end bell assembly (not shown) contained in sleeve 65 provides means for transmission of light from the mirror to the plasma tube 14. A suitable endbell assembly is described in U.S. Pat. No. 4,706,256 by Sheng et al., which is hereby incorporated in full into this disclosure by reference.

In another embodiment, as shown in FIG. 2, the rods 48 are 3.96 inches long at the anode end, and 2.71 inches long at the cathode end, with both sets of rods supporting coarse-adjustment mirror plates. In this embodiment, the mirrors are integrated into the structure of the plasma tube 14 and are each attached to a bellows 67 extending beyond the resonator tube 12. The mirrors are supported by mirror plate assemblies 46, and their position is adjusted by adjustment screws 62.

The preferred manner of assembly of the laser housing 10 of the present invention utilizes as a supporting frame, a baseplate, e.g., baseplate 82 in FIG. 2, to which the magnet assembly — which includes the electromagnet 16, the bobbin 20, the magnet cover 22, the cathode bobbin flange 66, the bobbin locknut 68 and the bobbin endcap 71 — is bracketed or otherwise secured in such a manner as to allow differential thermal expansion between the baseplate and the magnet assembly. The magnet assembly is in turn a structural supporting frame for the resonator assembly — which includes the resonator tube 12, the cathode resonator flange 70, the anode resonator flange 72, the mirror plate assemblies 46, and the resonator rods 48 — and the plasma tube 14. This structural supporting frame permits differential thermal expansion between the resonator assembly and the magnet assembly, and between the plasma tube and the magnet assembly by means of O-rings sandwiched between the respective tubes and assemblies. Accordingly, a preferred method of assembly comprises the following general steps. First, the electromagnet 16 is provided, having wire, e.g., copper wire, wound around the bobbin 20 (e.g., a brass tube) between the two magnet flanges 24, and the electromagnet 16 is inserted into a magnet cover 22 (e.g., a second brass tube). The magnet cover 22 is preferably firmly secured, such as by soldering, welding, brazing, adhering, etc., to the outside of the cathode bobbin flange 66. The bobbin 20 is threaded to the inside of the cathode bobbin flange 66. The bobbin endcap 71 is threaded to the other end of the bobbin 20, and the bobbin locknut 68 is sandwiched between the bobbin endcap 71 and the magnet cover 22, and is held in place by compression. This magnet assembly is inserted into the resonator tube 12 — which resonator tube 12 was preassembled with the cathode resonator flange 70 and the anode resonator flange 72 securely attached thereto at respective opposing ends, e.g., by welding, brazing, soldering, adhering, etc. This total structure can then be attached to the baseplate by bracketing means, e.g., bracket 80, at the cathode bobbin flange 66, and by a spherical bearing (not shown) at the anode end attached to the bobbin endcap 71. The plasma tube 14 is then inserted into the bobbin 20. The resonator rods 48 are then threaded into the cathode and anode resonator flanges 70 and 72 respectively. The mirror plate assemblies 46 are then attached to the resonator rods 48, e.g., by threading, as described above.

Of course, one of ordinary skill in the art will appreciate that the foregoing preferred embodiments are merely illustrative, and not limiting, and that the details of construction and dimensions can be varied substantially to suit individual applications.

The open air space at the ends of the laser housing 10 allows for easy access to the mirror plate assemblies 46 and endbell assembly in sleeve 65 for maintenance and adjustment, while preventing uneven cooling problems associated with trapped hot air. Water-cooling is unnecessary around the mirror plate assemblies 46 and endbell assembly in sleeve 65, since they are distanced from the heat generating electromagnet 16 and plasma tube 14. In addition, manufacturing tolerances involved in construction of the resonator tube 12 of the laser housing 10 are more easily attained due to the relatively decreased length of said tube 12.

Thus, a new and useful resonator for a water-cooled ion laser is disclosed, combining the advantageous features of an integrated, concentrically arranged, resonator/electromagnet/ plasma-tube laser assembly with external mounting means for the mirror plate assemblies. While embodiments and applications of this invention have been shown and described, it will be apparent to those of ordinary skill in the art that many more modifications are possible without departing from the inventive concepts herein. The invention, therefore, is intended to be commensurate with the full scope of the appended claims, and all equivalents thereto.

WHAT IS CLAIMED:

1. A laser housing comprising:
   a resonator tube;
   a magnet concentrically mounted in a spaced relationship within said resonator tube and defining with said resonator tube an outer coolant flow channel;
   a plasma tube concentrically mounted in a spaced relationship within said magnet and defining with said magnet an inner coolant flow channel; and
   at least one mirror plate assembly disposed externally to said resonator tube, supported by external mounting means.

2. The laser housing of claim 1, further comprising a resonator flange disposed adjacent to the resonator tube, wherein the external mounting means comprises at least one rod extending from said resonator flange.

3. The laser housing of claim 2, comprising two mirror plate assemblies, each supported by at least one rod extending from opposite ends of said resonator flange.

4. The laser housing of claim 3, wherein the each external mounting means comprises three rods.

5. The laser housing of claim 4, wherein the rods are made of a material having a low coefficient of thermal expansion.

6. The laser housing of claim 5, wherein the rods are essentially made of a compound selected from the group consisting of invar, graphite and quartz.

7. The laser housing of claim 6, further comprising at least one endbell assembly disposed at at least one end of the plasma tube and extending to at least one of the mirror plate assemblies.

8. The laser housing of claim 7 comprising two endbell assemblies, one disposed at each end of the plasma tube and each extending to a respective mirror plate assembly.

9. The laser housing of claim 6, comprising at least one mirror and at least one bellows, said bellows disposed at one end of the plasma tube, said mirror attached to an end of the bellows, and said mirror also attached to one of the mirror plate assemblies.

10. The laser housing of claim 9, comprising two mirrors and two bellows, each bellows extending to and each mirror attached to a respective mirror plate assembly.

11. A laser housing comprising:
    a resonator tube comprising a resonator flange;
    a magnet concentrically mounted in a spaced relationship within said resonator tube and defining with said resonator tube an outer coolant flow channel;

a plasma tube concentrically mounted in a spaced relationship within said magnet and defining with said magnet an inner coolant flow channel; and at least one mirror assembly disposed externally to the resonator tube, supported by at least one mounting rod extending from an end of said resonator tube.

12. The laser housing of claim 11, wherein the mirror assembly is supported by at least two mounting rods.

13. The laser housing of claim 12, wherein the mounting rods are essentially constructed of a compound selected from the group consisting of invar, quartz and graphite.

14. The laser housing of claim 13, wherein the mirror assemblies are each supported by three invar rods.

15. The laser housing of claim 11, comprising two mirror assemblies, one disposed at each end of the laser housing, each mirror assembly supported by at least one mounting rod extending from an opposing end of said resonator tube.

16. The laser housing of claim 15, wherein each mirror assembly is supported by three invar rods.

17. The laser housing of claim 16, wherein the resonator tube is substantially coextensive in length with the plasma tube.

18. The laser housing of claim 17, further comprising an endbell assembly, connecting a mirror assembly to the plasma tube.

19. The laser housing of claim 17, further comprising a bellows, connecting a mirror assembly to the plasma tube.

20. A laser housing comprising:
a plasma tube;
a resonator tube, extending substantially the length of said plasma tube and disposed substantially concentrically in spaced relationship thereto;
a magnet, substantially concentrically mounted in a spaced relationship with both said plasma tube and said resonator tube, disposed within said resonator tube and around said plasma tube; and
two mirror assemblies disposed externally to said resonator tube, each supported by at least one mounting rod extending from respective opposing ends of the resonator tube.

21. The laser housing of claim 20, wherein the mounting rods are essentially constructed of a compound selected from the group consisting of invar, quartz and graphite.

22. The laser housing of claim 21, wherein each mirror assembly is supported by three mounting rods.

23. The laser housing of claim 22, wherein the mounting rods are constructed of invar.

24. A laser housing comprising:
a plasma tube;
a resonator tube;
a magnet, substantially concentrically mounted in a spaced relationship with both said plasma tube and said resonator tube, disposed within said resonator tube and around said plasma tube;
two mirror assemblies disposed externally to said resonator tube, each supported by at least one mounting rod extending from respective opposing ends of the resonator tube;
wherein the resonator tube is of sufficient length to cooperate with the magnet in defining an outer coolant flow channel for the magnet.

25. The laser housing of claim 24 further comprising means for a coolant to flow in the outer coolant flow channel substantially along the length of the plasma tube.

* * * * *